(12) United States Patent
Jaffee

(10) Patent No.: US 7,842,629 B2
(45) Date of Patent: Nov. 30, 2010

(54) NON-WOVEN GLASS FIBER MAT FACED GYPSUM BOARD AND PROCESS OF MANUFACTURE

(75) Inventor: Alan Michael Jaffee, Bowling Green, OH (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 10/608,790

(22) Filed: Jun. 27, 2003

(65) Prior Publication Data
US 2004/0266304 A1 Dec. 30, 2004

(51) Int. Cl.
| | |
|---|---|
| D04H 1/00 | (2006.01) |
| D04H 3/00 | (2006.01) |
| D04H 13/00 | (2006.01) |
| D04H 5/00 | (2006.01) |
| B32B 5/18 | (2006.01) |
| B32B 13/00 | (2006.01) |
| B32B 37/00 | (2006.01) |
| B32B 3/18 | (2006.01) |
| B29C 65/00 | (2006.01) |

(52) U.S. Cl. .................. 442/348; 442/331; 442/374; 156/39; 156/40; 156/42

(58) Field of Classification Search .............. 428/440; 442/180, 331, 348, 374; 156/39, 40, 42
See application file for complete search history.

(56) References Cited

U.S. PATENT DOCUMENTS

| 4,195,110 A | 3/1980 | Dierks et al. ............. 428/218 |
| 4,637,951 A * | 1/1987 | Gill et al. ................. 428/215 |
| 4,647,496 A * | 3/1987 | Lehnert et al. ............ 442/386 |
| 4,722,866 A | 2/1988 | Wilson et al. ............. 428/411.1 |
| 4,784,897 A | 11/1988 | Brands et al. ............. 428/219 |
| 4,879,173 A | 11/1989 | Randall ................... 428/285 |
| 5,079,078 A | 1/1992 | Jutte, Jr. et al. ............. 428/251 |
| 5,148,645 A | 9/1992 | Lehnert et al. ............ 52/443 |
| 5,173,364 A | 12/1992 | Geeraert .................. 248/312.4 |
| 5,220,762 A | 6/1993 | Lehnert et al. ............ 52/408 |
| 5,342,680 A | 8/1994 | Randall ................... 422/71 |
| 5,371,989 A | 12/1994 | Lehnert et al. ........... 52/309.17 |
| 5,389,716 A * | 2/1995 | Graves ................... 524/510 |
| 5,395,685 A | 3/1995 | Seth et al. ................ 428/283 |

(Continued)

OTHER PUBLICATIONS

"Microdenier", Complete Textile Glossary, Celanese Acetate, 2001.*

(Continued)

*Primary Examiner*—Rena L Dye
*Assistant Examiner*—Jennifer Steele
(74) *Attorney, Agent, or Firm*—Robert D. Touslee

(57) ABSTRACT

A gypsum board comprises a set gypsum layer having a first face and a second face. A fibrous mat is affixed to at least one of the faces. The mat comprises a non-woven web bonded together with a resinous binder. The web comprises a blend of a major portion composed of chopped continuous glass fibers having an average fiber diameter ranging from about 8 to 17 µm and a minor portion composed of fine staple fibers having an average fiber diameter of less than about 5.5 µm, the minor portion comprising about 1-30 percent of the dry weight of the web. The board is exceedingly durable. It has a smooth surface that is readily finished in an aesthetically pleasing way, using paint or other wall covering systems.

27 Claims, 1 Drawing Sheet

U.S. PATENT DOCUMENTS

| | | | |
|---|---|---|---|
| 5,397,631 A | 3/1995 | Green et al. | 428/219 |
| 5,735,092 A | 4/1998 | Clayton et al. | 52/309.9 |
| 5,772,846 A | 6/1998 | Jaffee | 162/145 |
| 5,791,109 A | 8/1998 | Lehnert et al. | 52/309.17 |
| 5,883,024 A | 3/1999 | O'Haver-Smith et al. | 442/333 |
| 5,891,563 A | 4/1999 | Letts | 428/318.4 |
| 5,981,406 A | 11/1999 | Randall | 442/71 |
| 6,001,496 A | 12/1999 | O'Haver-Smith | 428/703 |
| 6,044,604 A | 4/2000 | Clayton et al. | 52/309.9 |
| 6,110,575 A | 8/2000 | Haga | 428/294.7 |
| 6,187,697 B1 | 2/2001 | Jaffee et al. | 442/149 |
| 6,294,253 B1 | 9/2001 | Smith, Jr. | 428/361 |
| 6,365,533 B1 * | 4/2002 | Horner et al. | 442/374 |
| 6,368,991 B1 | 4/2002 | Horner, Jr. et al. | 442/374 |
| 6,521,086 B2 | 2/2003 | Smith, Jr. | 162/56 |
| 6,524,679 B2 | 2/2003 | Hauber et al. | 428/68 |
| 6,579,413 B1 | 6/2003 | Grove | 162/145 |
| 6,723,670 B2 * | 4/2004 | Kajander et al. | 442/374 |
| 6,770,354 B2 | 8/2004 | Randall et al. | 428/219 |
| 6,800,361 B2 | 10/2004 | Bruce et al. | 428/294.7 |
| 6,841,230 B2 | 1/2005 | Yokoo et al. | 428/294.7 |
| 6,878,321 B2 | 4/2005 | Hauber et al. | 264/129 |
| 2003/0032350 A1 * | 2/2003 | Kajander et al. | 442/76 |
| 2003/0032351 A1 | 2/2003 | Horner, Jr. et al. | 442/76 |
| 2004/0209071 A1 * | 10/2004 | Carbo et al. | 428/328 |
| 2005/0079335 A1 | 4/2005 | Wilkins | 428/292.1 |
| 2005/0079786 A1 | 4/2005 | Wilkins | 442/388 |
| 2005/0155198 A1 | 7/2005 | Walters et al. | 28/100 |
| 2005/0202258 A1 | 9/2005 | Swales et al. | 428/447 |
| 2005/0221705 A1 | 10/2005 | Hitch | 442/180 |
| 2005/0238863 A1 | 10/2005 | Swales et al. | 428/292.1 |

OTHER PUBLICATIONS

Johns Manville Product Information: Glass Fiber Mats, Dura Glass® 7529.

* cited by examiner

NON-WOVEN GLASS FIBER MAT FACED GYPSUM BOARD AND PROCESS OF MANUFACTURE

BACKGROUND OF THE INVENTION

1. Field of the Invention

The present invention relates to a gypsum board used in building construction and to a process for its manufacture; and more particularly, to a non-woven glass fiber mat comprising a blend of glass fibers having different diameters and lengths bonded together with a resinous latex binder, a gypsum board or similar product in panel form faced on at least one side with such a mat, and processes for the manufacture thereof.

2. Description of the Prior Art

Wallboard formed of a gypsum core sandwiched between facing layers is used in the construction of virtually every modern building. In its various forms, the material is employed as a surface for walls and ceilings and the like, both interior and exterior. It is relatively easy and inexpensive to install, finish, and maintain, and in suitable forms, is relatively fire resistant.

Although paper-faced wallboard is most commonly used for finishing interior walls and ceilings, other forms with different kinds of facings have superior properties that are essential for other uses. One known facing material is non-woven fiberglass mat.

Gypsum wallboard and gypsum panels are traditionally manufactured by a continuous process. In this process, a gypsum slurry is first generated in a mechanical mixer by mixing at least one of anhydrous calcium sulfate ($CaSO_4$) and calcium sulfate hemihydrate ($CaSO_4 \cdot \frac{1}{2}H_2O$, also known as calcined gypsum), water, and other substances, which may include set accelerants, waterproofing agents, reinforcing mineral, glass fibers, and the like. The gypsum slurry is normally deposited on a continuously advancing, lower facing sheet, such as kraft paper. Various additives, e.g. cellulose and glass fibers, are often added to the slurry to strengthen the gypsum core once it is dry or set. Starch is frequently added to the slurry in order to improve the adhesion between the gypsum core and the facing. A continuously advancing upper facing sheet is laid over the gypsum and the edges of the upper and lower facing sheets are pasted to each other with a suitable adhesive. The facing sheets and gypsum slurry are passed between parallel upper and lower forming plates or rolls in order to generate an integrated and continuous flat strip of unset gypsum sandwiched between the sheets. Such a flat strip of unset gypsum is known as a facing or liner. The strip is conveyed over a series of continuous moving belts and rollers for a period of several minutes, during which time the core begins to hydrate back to gypsum ($CaSO_4 \cdot 2H_2O$). The process is conventionally termed "setting," since the rehydrated gypsum is relatively hard. During each transfer between belts and/or rolls, the strip is stressed in a way that can cause the facing to delaminate from the gypsum core if its adhesion is not sufficient. Once the gypsum core has set sufficiently, the continuous strip is cut into shorter lengths or even individual boards or panels of prescribed length.

After the cutting step, the gypsum boards are fed into drying ovens or kilns so as to evaporate excess water. Inside the drying ovens, the boards are blown with hot drying air. After the dried gypsum boards are removed from the ovens, the ends of the boards are trimmed off and the boards are cut to desired sizes. The boards are commonly sold to the building industry in the form of sheets nominally 4 feet wide and 8 to 12 feet or more long and in thicknesses from nominally about ¼ to 1 inches, the width and length dimensions defining the two faces of the board.

While paper is widely used as a facing material for gypsum board products because of its low cost, many applications demand water resistance that paper facing cannot provide. Upon exposure to water either directly in liquid form or indirectly through exposure to high humidity, paper is highly prone to degradation, such as by delamination, that substantially compromises its mechanical strength. Gypsum products typically rely on the integrity of the facing as a major contributor to their structural strength. Consequently, paper-faced products are generally not suited for exterior or other building uses in which exposure to moisture conditions is presumed.

In addition, there is growing attention being given to the issue of mold and mildew growth in building interiors and the potential adverse health impact such activity might have on building occupants. The paper facing of conventional gypsum board contains wood pulp and other organic materials that may act in the presence of moisture or high humidity as nutrients for such microbial growth. A satisfactory alternative facing material less susceptible to growth is highly sought.

A further drawback of paper-faced gypsum board is flame resistance. In a building fire, the exposed paper facing quickly burns away. Although the gypsum itself is not flammable, once the facing is gone the board's mechanical strength is greatly impaired. At some stage thereafter the board is highly likely to collapse, permitting fire to spread to the underlying framing members and adjacent areas of a building, with obvious and serious consequences. A board having a facing less susceptible to burning would at least survive longer in a fire and thus be highly desirable in protecting both people and property.

To overcome these and other problems, a number of alternatives to paper facing have been proposed. U.S. Pat. No. 4,647,496 discloses an exterior insulation system including a fibrous mat-faced gypsum board having a set gypsum core that is water-resistant. The fibrous mat is preferably sufficiently porous for the water in the gypsum slurry to evaporate during the production drying operation as the gypsum sets. The mat comprises fibrous material that can be either mineral-type or a synthetic resin. One preferred mat comprises non-woven glass fibers, randomly oriented and secured together with a modified or plasticized urea formaldehyde resin binder, and sold as DURA-GLASS® 7502 by the Manville Building Materials Corporation.

However, gypsum board products incorporating such conventional fibrous mats have proven to have certain drawbacks. While fibrous mats are undesirably more costly than the traditionally used kraft paper, there are other, more troublesome issues as well. Some persons are found to be quite sensitive to the fiberglass mat, and develop skin irritations and abrasions when exposed to the mat at various stages, including the initial production of the mat, the manufacture of composite gypsum board with the mat facing, and during the cutting, handling, and fastening operations (e.g., with nails or screws) that attend installation of the end product during building construction. Handling of the mat, and especially cutting, is believed to release glass fibers responsible for the irritation. The fibers may either become airborne or be transferred by direct contact. As a result, workers are generally forced to wear long-sleeved shirts and long pants and to use protective equipment such as dust masks. Such measures are especially unpleasant in the sweaty, hot and humid conditions often encountered either in manufacturing facilities or on a construction jobsite.

There have been suggestions that a small portion of the glass fiber in such mats be replaced by polymer fiber materials and that an acrylic binder be used instead of urea formaldehyde resin. While gypsum boards incorporating such mats have somewhat improved strength and handling characteristics, they are undesirably more expensive to make and stiffer and less fire resistant. Moreover, the problems of irritation from dust released, e.g. during cutting, remain.

In addition, many of the available non-paper faced gypsum boards have further features that make them undesirable for many of the wall facing applications for which they are intended. For example, the surface roughness of current fiber-faced boards makes them difficult to finish satisfactorily by normal painting, because the texture of the mat remains perceptible through the paint. The fibers in the mat themselves give rise to various asperities, and to additional, larger sized irregularities often termed in the industry with descriptives such as "orange peel", "cockle", or similarly evocative terms describing surface non-planarity. The perceived smoothness of a board surface is the result of a complex interplay between various topographic features of the board, including the size, depth, spacing, and regularity of the features. In most instances, the smoothness of different board surfaces may readily be compared and ranked by visual inspection, especially under illumination by obliquely incident light. In addition, image analysis techniques are useful in quantifying certain of the topological features seen on various gypsum board surfaces.

Many of the aforementioned surface defects arise during the drying or curing of the mat or gypsum board. Even after painting, these defects and the underlying fibrous texture remain perceptible and aesthetically unappealing. As a result, a uniform, smooth finish can be achieved only in conjunction with a prior ameliorative treatment. Typically it is necessary to skim coat the surface with drywall joint compound or the like and then sand to a requisite smoothness to achieve a surface that will accept paint satisfactorily. This treatment must be accomplished at the construction site, resulting in added labor and materials cost. The additional steps entail inconvenience and delay, the consequences of the time needed for applying and drying the coating, and the generation of further nuisance dust. These difficulties are not encountered with paper-faced gypsum board, whose as-produced surface is smooth enough to accept paint readily with a minimum of surface preparation. Accordingly, current fiber-faced gypsum board is seldom if ever used for interior finished walls.

Another form of mat-faced gypsum board is known from U.S. Pat. No. 4,879,173, which discloses a mat of non-woven fibers having a reinforcing resinous binder that can comprise a single resin or a mixture of resins, either thermoplastic or thermosetting. Exemplary resins disclosed include a styrene-acrylic copolymer and a self-crosslinking vinyl acetate-acrylic copolymer. A small amount of the binder is applied to the surface of the mat and penetrates but part of the way therethrough. The board is said to be useful as a support member in a built-up roof. The highly textured surface of the mat binder provides many interstices into which can flow an adhesive used to adhere an overlying component. However, considerable care is required in using a mat containing substantial numbers of voids as a facer for gypsum board. Conventional processing that incorporates deposition of a relatively wet slurry is generally found to result in considerable intrusion of the slurry through the mat and onto the faced surface, which is frequently undesirable. Prevention of this excess intrusion typically requires very careful control of the slurry viscosity, which, in turn, frequently leads to other production problems. Alternative mats, which inherently limit intrusion, yet still have sufficient permeability to permit water to escape during the formation and heat drying of the gypsum board are thus eagerly sought as a simpler alternative.

A fibrous mat facer with improved strike-through resistance and useful as a facer substrate or carrier for receiving a curable substance in a fluid state is disclosed by U.S. Pat. No. 4,637,951. The porous, non-woven mat comprises a blend of microfibers intermixed and dispersed with base fibers and bound with a binder comprising a water miscible combination of a heat settable polymer. The mat is said to be useful in forming composite materials employing a curable thermoset, preferably foamable material such as a polyurethane or polyisocyanurate rigid foam board and as a carrier web in the vinyl flooring industry where the settable polymer comprises a vinyl plastisol.

Notwithstanding the advances in the field of gypsum boards and related articles, there remains a need for a readily and inexpensively produced mat-faced gypsum board having one or more of a smoother surface, a stronger internal bond to prevent delamination of the facer when subjected to prolonged wetness after installation, a surface requiring less paint to produce an aesthetically acceptable finished wall, ceiling, or the like, and better flame and mold resistance.

SUMMARY OF THE INVENTION

The present invention provides a gypsum board and a process for the manufacture thereof. The board comprises a layer of set gypsum having a first face and a second face and a fibrous mat affixed to at least one of the faces. The mat includes a non-woven web comprising a blend of a major portion composed of chopped continuous glass fibers having an average fiber diameter ranging from about 8 to 17 µm and a minor portion composed of fine staple fibers having an average fiber diameter of less than about 5.5 µm. The minor portion comprises about 1-30 percent of the dry weight of the web.

The gypsum board of the invention typically is used for a number of purposes in building construction, such as a surface material for walls and ceilings and as an underlayment for floors, roofs, and the like. The board finds application in both interior and exterior environments.

As a result of the blend of fibers in the facing, the board has a smooth, uniform surface that readily accepts paint or other surface treatments to provide a pleasing aesthetic appearance. Various embodiments of the invention have further desirable attributes, including resistance to flame, moisture, and growth of mold and mildew. In addition, the inadvertent release of fibers from the mat used in the present gypsum board is minimized, limiting the incidence of skin irritation among workers involved in either production or installation of the board.

BRIEF DESCRIPTION OF THE DRAWING

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
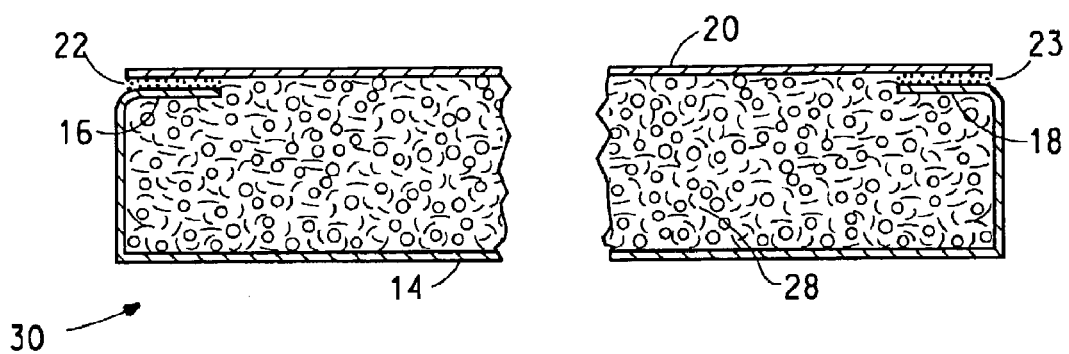
FIG. 1 is a cross-sectional view of a mat-faced gypsum board of the invention.

The present invention provides gypsum board and other hydraulic set and cementitious boards having front and back large surfaces, at least one of which is faced with a non-woven, fibrous mat. By hydraulic set is meant a material capable of hardening to form a cementitious compound in the presence of water. Typical hydraulic set materials include gypsum, Portland cement, pozzolanic materials, and the like.

Referring now to FIG. 1, there is shown generally at 30 a sectional view across the width direction of one embodiment of a mat-faced gypsum board in accordance with the invention. The board comprises a layer of set gypsum 28, which is sandwiched between first and second fibrous mats 14, 20, and bonded thereto. Two right-angled folds are formed in each lateral edge of first mat 14, a first upward fold and a second inward fold. The two folds are separated by a small distance, whereby the thickness of board is generally determined. The second folds define longitudinally extending strips 16 and 18 that are substantially parallel to the main part of the mat. A second fibrous mat 20 covers the other side of the set gypsum core 28. The respective lateral edges of second mat 20 are affixed to strips 16 and 18, preferably with adhesive 22, 23. Ordinarily board 30 is installed with the side bearing mat 14 facing a finished space. The board is advantageously ready for painting, but other finishing forms such as plaster, wallpaper or other known wall coverings may also be applied with a minimum of surface preparation.

The mats used in the present invention for one or both of the large faces of the gypsum board comprise a non-woven web bonded together with a resinous binder. The web consists essentially of a blend of a major portion composed of chopped continuous glass fibers having an average diameter ranging from about 8 to about 17 μm and a minor portion composed of fine staple fibers, also called microfibers. The minor portion comprises about 1-30 percent, and preferably about 20-30 percent, of the weight of the dry web. The fine fibers have an average fiber diameter of less than about 5.5 μm, and preferably an average fiber diameter of less than about 3.5 μm, and more preferably less than about 1.9 μm. In addition, the fine fibers preferably have a fiber length of less than about 7 mm. In one embodiment, the chopped strand fibers preferably have fairly uniform fiber diameters and lengths, although mixtures of different lengths and different fiber diameters are contemplated and included within the scope of the invention.

Chopped strand fibers are readily distinguishable from staple fibers by those skilled in the art. Staple fibers are usually made by processes such as rotary fiberization or flame attenuation of molten glass known in the fiber industry. They typically have a wider range of lengths and fiber diameters than chopped strand fibers. Commonly the microfibers have a distribution of lengths ranging from a few times their diameters up to about 7 mm, with a few fibers as long as about 12 mm. One method of making the fine fibers is disclosed by U.S. Pat. No. 4,167,404, which disclosure is hereby incorporated in the entirety by reference thereto.

The use of fibrous mats containing a combination of chopped, relatively large diameter fibers and staple microfibers of lesser diameter in producing gypsum board and related products conveys a number of advantages over boards made with other known fibrous mats. The smaller fibers tend to fill the interstices between large fibers, thereby limiting the intrusion of gypsum slurry into and through the mat onto the board surface. Surprisingly, this control is achieved without unduly compromising the permeability of the mat for residual water vapor in the gypsum that must be removed during board production. The distribution of chopped fiber diameters may have a single mode, but may optionally be multi-modal. In some embodiments, suitable arrangement of the distribution of fiber size affords further and more precise control of the porosity and air permeability of the fibrous mat and the corresponding propensity for bleed-through of the gypsum slurry. As a result, the need for careful control of slurry viscosity during board production with the present mat is greatly eased, leading to cost reduction and manufacturing efficiency.

Even more importantly, the surface of boards made in accordance with the present invention has an improved "hand," i.e., an improved subjective feel, and better accepts surface treatments because of its greater smoothness. Even after prior art boards are coated with substantial amounts of paint in multiple coats, the texture of the facing mat in many instances remains visible, making the surface aesthetically unpleasing for many applications. By way of contrast, the present boards may be finished to provide an aesthetic and functional surface with far less paint and the associated labor to prepare the surface and apply the paint or other desired finish, wallpaper or other coating, or the like.

Surprisingly, better smoothness is achieved in mats having a relatively low content of small staple fibers. By way of contrast, it would have been anticipated that the smoothest mats would be obtained with a preponderance of fine fibers.

A preferred continuous glass fiber for the major portion of the fibrous web is at least one member selected from the group consisting of E, C, and T type and sodium borosilicate glasses. As is known in the glass art, E glass refers to a family of glasses typically with a calcium aluminoborosilicate composition and a maximum alkali content of 2.0% that are also known as electrical glasses. E glass fiber is commonly used to reinforce various articles. C glass typically has a soda-lime-borosilicate composition that provides it with enhanced chemical stability in corrosive environments, and T glass usually has a magnesium aluminosilicate composition and especially high tensile strength in filament form. The chopped fibers of the major portion can have varying lengths, but more commonly are substantially of similar length. More preferred is E glass fiber having an average fiber diameter ranging from about 10 to 16 μm and a length ranging from about 5 to 30 mm. E glass fiber has sufficiently high strength and other mechanical properties to produce acceptable mats and is relatively low in cost and widely available. Most preferred is E glass having an average fiber diameter of about 11±1.5 μm and a length ranging from about 6 to 12 mm.

The staple fibers used for the minor portion of the web are preferably glass or mineral fibers, such as mineral wool, slag wool, ceramic fibers, carbon fibers, metal fibers, refractory fibers, or mixtures thereof. Other synthetic or polymer fibers, such as melt blown micro denier fibers of polyester, nylon, polyethylene, polypropylene, or the like, may also be used. Although it is preferred that the aforementioned fibrous mat comprising a blend of fibers be used for both facings of the board, one of the faces may also be formed with kraft paper, other glass mats, or other facings conventionally used in gypsum board.

The aforementioned glass fibers are bound together with any known water resistant resinous binder. Suitable binders include urea formaldehyde; conventional modified urea formaldehyde; acrylic resins; melamine resins, preferably having a high nitrogen resins such as those disclosed by U.S. Pat. No. 5,840,413; homopolymers or copolymers of polyacrylic acid having a molecular weight of less than 10,000, preferably less than 3,000; crosslinking acrylic copolymer having a glass transition temperature (GTT) of at least about 25° C., crosslinked vinyl chloride acrylate copolymers having a GTT preferably no higher than about 113° C.; and other known flame and water resistant conventional mat binders. It is typically found that a lower GTT promotes better softness and smoothness of the mat surface, but tensile strength is improved with a higher GTT. Binder systems having a GTT ranging from about 15 to 45° C. are thus preferred. Aqueous modified and plasticized urea formaldehyde resin binders may be used and have low cost and acceptably high performance.

It is further preferred that the binder used for the present mats comprise an effective amount of a water repellant to limit the intrusion of gypsum slurry during board production. For example, vinyl acrylate latex copolymers may further incorporate stearylated melamine for improvement in water repellency, preferably at a level ranging from about 3 to 10 wt. %, and more preferably at about 6 wt. %. A suitable aqueous stearylated melamine emulsion is available from the Sequa Chemical Corporation, Chester, S.C., under the tradename SEQUAPEL™ 409. The stearylated melamine is in liquid form having a solids content of about 40 wt. percent and is mixed with a suitable copolymer latex and water to prepare binders for the mats. This material mixture has a pH of about 9, a viscosity of about 45 centipoises and is anionic. In addition, gypsum board incorporating mat with the preferred binder is more resistant to abrasion than board faced with either paper or conventional fibrous mats.

A preferred binder for the present mat comprises an acrylate copolymer binder latex with a GTT of about 25° C. available from Noveon, Inc. of Cleveland, Ohio, under the tradename Hycar™ 26138. As delivered, this acrylate copolymer latex has a solids content of about 50 weight percent solids, but it is preferred to dilute the concentration with water to about 25 wt. percent solids before using it. Preferably up to about 10 weight percent of a crosslinker such as melamine formaldehyde is added to the acrylate; and more preferably about 2 to 5 weight percent of crosslinker is added. Advantageously, mat bound with the acrylate copolymer latex is smoother and the mat thinner for equivalent weight and properties than with other known binders. In addition, expensive fluorochemical emulsions needed in prior art binders are not required.

The amount of acrylate copolymer latex binder (and any optional cross-linker) left in the wet mat during manufacture can be determined by a loss on ignition (LOI) test, the result thereof being specified as a percentage of the dry weight of the finished mat. Preferably, the amount of binder in the final mat, based on its dry weight, ranges from about 15 to 35 wt. percent, with about 20-30 wt. percent being more preferred, and 25±2.5 wt. percent being most preferred. The upper limit is dictated by process constraints and cost, while the minimum is required for adequate tensile strength.

Optionally the fibrous mats of the present invention further contain fillers, pigments, or other inert or active ingredients either throughout the mat or concentrated on a surface. For example, the mat can contain effective amounts of fine particles of limestone, glass, clay, coloring pigments, biocide, fungicide, intumescent material, or mixtures thereof. Such additives may be added for known structural, functional, or aesthetic qualities imparted thereby. These qualities include coloration, modification of the structure or texture of the surface, resistance to mold or fungus formation, and fire resistance. Preferably, flame retardants sufficient to provide flame resistance, e.g. according to NFPA Method 701 of the National Fire Protection Association or ASTM Standard E84, Class 1, by the American Society for the Testing of Materials, are added. Biocide is preferably added to the mat and/or gypsum slurry to resist fungal growth, measurable in accordance with ASTM Standard D3273.

Gypsum board in accordance with the present invention preferably is faced with a mat having a basis weight ranging from about 0.6 to 2.2 pounds per 100 square feet, more preferably ranging from about 0.9 to 2.2 lbs./100 sq. ft., and most preferably about 1.25±0.2 lbs./100 sq. ft. (about 29-110, 45-110, and 60±10 g/m$^2$, respectively). Preferably the binder content of the dried and cured mats ranges from about 10 to 35 wt. percent, more preferably from about 15 to 30 wt. percent, and most preferably from about 25±3 wt. percent, based on the weight of the finished mat. The basis weight must be large enough to provide the mat with sufficient tensile strength for producing quality gypsum board. At the same time, the binder content must be limited for the mat to remain sufficiently flexible to permit it to be bent to form the corners of the board, as shown in FIG. 1. Furthermore, too thick a mat renders the board difficult to cut during installation. Such cuts are needed both for overall size and to fit the board around protrusions such as plumbing and electrical hardware.

It is conventional in the wallboard industry to characterize mat and other facing materials using mechanical testing machines with samples about 7.5 cm (3 inches) wide. Tests are conducted with tension applied either in the machine direction (i.e., along the mat's elongated dimension) or in the cross-machine direction (i.e., along its width). Mats having adequate strength in both the machine and cross-machine directions are required for producing gypsum board that will withstand the stresses invariably encountered in manufacturing, handling, shipping, and installing the board. It is also preferred that the combined strengths in the two directions be high for the same reason.

The utility of the present mat is further enhanced by its relatively high air permeability. During the gypsum board formation process, far more water is present in the gypsum slurry than is stochiometrically needed to drive the gypsum rehydration reaction. The excess is removed during a drying operation, and preferably escapes through the facings. Hence, facers must have sufficient permeability to allow the drying to be accomplished within an acceptable time period and without bubbling, delamination, or other degradation of the facer. The air permeability of a mat is conventionally measured by the air flow between reservoirs separated by the mat. One such test is called the Frazier test and further described by ASTM Standard Method D737, with the results ordinarily being given in units of cubic feet per minute per square foot (cfm/ft$^2$). The test is usually carried out at a differential pressure of about 0.5 inches of water. In preferred embodiments, the permeability of the present mat, as measured by the Frazier method, is at least about 250, and more preferably, at least about 300 cfm/ft$^2$.

Any suitable method may be used to form the present mats. One such method, known from U.S. Pat. No. 4,129,674, employs a wet-laid, inclined wire screen mat-forming machine. Generally stated, the method comprises forming a slurry, preferably a water slurry, containing the requisite fibers. The solids content of such a slurry may be very low, such as approximately 0.2%. The slurry is intensely mechanically agitated to disperse the fibers uniformly therein and then dispensed onto a moving screen. A vacuum is applied to remove a substantial part of the water, which is preferably recycled, and thereby form a web of the fibers. After application of a binder, the web is heated to evaporate any remaining water and cure the binder, thus forming the bonded mat. Preferably, the mat-forming process is carried out in a continuous operation. The moving screen is provided as a continuous conveyor-like loop and is slightly upwardly inclined during the portion of its travel in which the fiber slurry is deposited thereon. Subsequently, a binder is applied and the mat heated to effect final drying and curing. After the vacuum step is completed, the web is optionally transferred to one or more additional downstream conveyor systems for binder application and passage through a heated oven for the final drying and curing operation. Machines suitable for carrying out such a web-forming process are available commercially and include devices manufactured under the tradenames Hydroformer™ by Voith-Sulzer of Appleton, WS, and Deltaformer™ by Valmet/Sandy Hill of Glenns Falls, N.Y.

The aqueous binder solution is preferably applied using a curtain coater or a dip and squeeze applicator. Normally, the mat is subjected to temperatures of about 120-330° C. for periods usually not exceeding 1 or 2 minutes, and frequently less than 40 seconds, for the drying and curing operations. Alternative mat forming methods useful in forming mat for the present invention include the use of well-known cylinder forming and "dry laying."

The invention further provides a method for making gypsum board and other hydraulic set and cementitious board products for interior and/or exterior use, i.e. products appointed for installation on either interior or exterior surfaces of building structures. By exterior surface is meant any surface of a completed structure expected to be exposed to weather; by interior surface is meant a surface within the confines of an enclosed, completed structure and not intended to be exposed to weather. The above-described non-woven, fibrous mat is present on at least one of the large faces of the gypsum board.

The present improved gypsum board production method comprises the steps of: forming an aqueous slurry comprising at least one of anhydrous calcium sulfate, calcium sulfate hemi-hydrate, and hydraulic setting cement; distributing the slurry to form a layer on a first facing; applying a second facing onto the top of the layer; separating the resultant board into individual articles; and drying the articles. The process is characterized in that at least one of the facings comprises a non-woven, fibrous mat having a fibrous web comprising a blend of fibers, including a major portion of chopped continuous glass fibers and a minor amount of fine staple fibers. The chopped continuous fibers have an average fiber diameter ranging from about 8 to 17 μm, and the staple fibers have an average or mean fiber diameter of less than about 5.5 μm. The fibers in the web are bound together with a polymeric binder. Alternatively, the slurry may be distributed to form a layer between two facings. The slurry optionally includes reinforcing fibers or other known additives used as process control agents or to impart desired functional properties to the board, including one or more of agents such as biocides, flame retardants, and water repellants. The product of the invention is ordinarily of a form known in the building trades as board, i.e. a product having a width and a length substantially greater than its thickness. Gypsum and other hydraulic set and cementitious board products are typically furnished commercially in nominal widths of at least 2 feet, and more commonly 4 feet. Lengths are generally at least 2 feet, but more commonly are 8-12 feet.

Gypsum and other hydraulic set boards made in accordance with the present invention exhibit a number of desirable qualities. The fibrous mat used results in a surface that is smoother and more amenable to painting or other surface finishing processes than prior art boards, The mat is also more flexible, facilitating the bending operations needed to fold the facer around the core during production, as illustrated for mat 14 in FIG. 1. Moreover, board incorporating the fibrous mat of the invention has a reduced tendency to generate irritating dust during cutting and handling than prior art boards faced with other facing materials.

In practicing the method of the invention, any known process for making mat faced gypsum board can be used along with the mats described for facing at least one major face of the gypsum boards of the present invention. For example, those processes described in U.S. Pat. Nos. 4,647,496, 5,220, 762, 6,524,679, all herein incorporated by reference, are typical, but the method of the present invention is not limited to only these known processes of making fibrous mat faced gypsum board.

The following examples are presented to provide a more complete understanding of the invention. The specific techniques, conditions, materials, proportions and reported data set forth to illustrate the principles and practice of the invention are exemplary and should not be construed as limiting the scope of the invention.

Comparative Example 1

Preparation and Testing of a Conventional Non-Woven Glass Fiber Mat

A non-woven glass fiber mat of a type typically used as a facer for conventional gypsum board is prepared using a wet laid mat machine in the manner disclosed in U.S. Pat. No. 4,129,674, which is hereby incorporated in the entirety by reference thereto. The mat, designated as comparative example 1, contains chopped glass fibers and is bonded together with a polymer binder containing a small amount of water repellant. The specific materials used are set forth in Table I. The M137 and K137 glass fibers are commercially available from the Johns Manville Corporation of Denver, Colo. A conventional modified urea formaldehyde binder is applied with a curtain coating/saturation technique.

TABLE I

Constituents of Conventional Non-Woven Glass Fiber Mats

| | Property | Comparative Example 1 |
|---|---|---|
| Fiber | type | K137 |
| | avg. length (mm) | 19 |
| | avg. fiber diam. (μm) | 13 |
| | amount (wt. %. of mat) | 79 |
| Binder | type | modified urea formaldehyde |
| | amount (wt. %. of mat) | 21 |

Standard tests for characterizing the physical and mechanical properties are carried out on the comparative example mat, including basis weight per unit area, loss of weight on ignition, and thickness. Strengths are measured both along the web direction and across the web, using a conventional mechanical testing machine to determine the peak tensile strength of a sample about 7.5 cm wide. The stiffness is determined using the standard Taber stiffness test, wherein a 38 mm wide strip is deflected by applying force at a point 50 mm from a clamping point. The torque (in g-cm) required to achieve a 15 deflection is conventionally termed the Taber stiffness. Air permeability is measured using the Frazier test at a differential pressure of 0.5 inches of water in accordance with ASTM Method D737.

TABLE II

Physical and Mechanical Properties of Conventional Non-Woven Glass Fiber Mats

| Physical/Mechanical Property | Comparative Example 1 |
|---|---|
| Basis weight (lbs./100 sq. ft.) | 2.1 |
| LOI (%) | 21 |
| Thickness (mils) | 36.5 |
| Machine Direction (Tensile Strength lbs./3 in. width) | 124 |
| Cross Machine (Tensile Strength lbs./3 in. width) | 84 |
| Tabor Stiffness | 45 |
| Frazier Permeability (cfm/ft$^2$) | 625 |

Examples 2-5

Preparation and Testing of Non-Woven Glass Fiber Mats of the Invention

Four non-woven fiberglass mats designated as Examples 2-5 are formed using a wet laid mat machine in the manner disclosed in U.S. Pat. No. 4,129,674. Each mat contains a blend of glass fibers of various average fiber diameters as set forth in Table III.

Examples 2-3 contain a blend of about 75 weight percent of fiber content H 137 chopped glass fibers about 12 mm long and having an average fiber diameter of about 11 μm, and about 25 wt. percent fiber content of CX 253 glass staple fiber having an average fiber diameter of about 5 μm. Both fibers are available from Johns Manville Corporation of Denver, Colo. The fibers make up about 73±1.5 wt. percent of the mat, based on the weight of the dry mat. The mat is made on a wet-laid, inclined wire screen mat forming machine. The fibers are bonded together with about 26±1.5 wt. percent of a cured modified acrylic binder, composed of Hycar™ 26138, an acrylic resin latex having a glass transition temperature of about 25° C., and about 2.5 wt. % melamine formaldehyde. The Hycar™ 26138 resin latex is available from Noveon, Inc. of Cleveland, Ohio. A curtain coating/saturation technique is used to apply the binder.

Examples 4-5 contain a blend of about 75 weight percent H 137 chopped glass fibers about 12 mm long and having an average fiber diameter of about 11 μm, and about 25 wt. percent of 210X glass staple fiber having an average fiber diameter of about 3 μm. Both fibers are available from Johns Manville Corporation of Denver, Colo. The fibers make up about 71±1.5 wt. percent of the mat, based on the weight of the dry mat. They are bonded together with about 29±1.5 wt. percent of the same Hycar™ 26138 used in preparing the mats of Examples 3-4. The mat formation and binder application techniques are the same as for preparing the mats of Examples 2-3.

TABLE III

Constituents of Non-Woven Glass Fiber Mats of the Invention

| | | | Example | |
|---|---|---|---|---|
| | Property | | 2, 3 | 4, 5 |
| Fiber | type | | H137 | H137 |
| | avg. length (mm) | | 12 | 12 |
| | avg. fiber diam. (μm) | | 11 | 11 |
| | amount (wt. %. of total fiber) | | 75 | 75 |
| Staple | type | | CX 253 | 210X |
| | avg. fiber diam. (μm) | | 5 | ∴3 |
| | amount (wt. %. of total fiber) | | 25 | 25 |
| Total Fiber | amount (wt. %. of mat) | | 73 ± 1.5 | 71 ± 1.5 |
| Binder | type | | Hycar™ 26138 + 2.5 wt. % melamine formaldehyde | Hycar™ 26138 + 2.5 wt. % melamine formaldehyde |
| | amount (wt. %. of mat) | | 26 ± 1.5 | 29 ± 1.5 |

The physical and mechanical properties of the mats of Examples 2-5 are characterized using the techniques delineated for Comparative Example 1. The results are set forth in Table IV.

TABLE IV

Physical and Mechanical Properties of Non-Woven Glass Fiber Mats of the Invention

| | Example | | | |
|---|---|---|---|---|
| Physical/Mechanical Property | 2 | 3 | 4 | 5 |
| Basis Weight (lbs./100 sq. ft.) | 0.74 | 1.65 | 0.73 | 1.65 |
| LOI (%) | 26 | 28 | 28 | 30 |
| Thickness (mils) | 17 | 25 | 19 | 21 |
| Machine Direction (Tensile Strength lbs./3 in. width) | 78 | 125 | 78 | 62 |
| Cross Machine (Tensile Strength lbs./3 in. width) | 87 | 146 | 80 | 99 |
| Taber Stiffness | — | 53 | — | 46 |
| Frazier Permeability (cfm/ft$^2$) | 398 | 464 | 314 | 303 |

All of the mats of Examples 2-5 exhibit acceptable values for the sum of machine direction and cross machine direction strengths.

Example 6

Preparation and Testing of Gypsum Board Having Non-Woven Glass Fiber Facer Mat

The mats of the above Comparative Example 1 and Examples 3 and 5 of the invention are used as facers for the manufacture of gypsum board in a manner as disclosed in U.S. Pat. No. 4,647,496. Smoothness is determined by relative ranking of samples observed for shadows cast by surface irregularities when viewed under low incident light angle. Samples with deeper surface or non-uniform irregularities are ranked lower than shallow or uniform irregularity. Samples are ranked on a scale of 1-10 with 10 being completely smooth. The mats of Examples 3 and 5 produce gypsum board having smoothnesses rated at 7 and 5, respectively, and are therefore smoother than board made with the mat of Comparative Example 1, which has a smoothness rating of 4. It is unexpected and surprising that the smoothness of the dry cured mat is not indicative of the smoothness of that same surface after the mat passes through the gypsum board manufacturing process.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A gypsum board, comprising:
   a. a gypsum layer having a first face and a second face and comprising set gypsum; and
   b. first and second facers affixed to said first and second faces, said first facer being a fibrous mat comprising a non-woven web bonded together with a resinous binder, and said web comprising a blend of a major portion composed of chopped glass fibers having an average fiber diameter of about 11±1.5 μm and a minor portion composed of fine staple fibers having an average fiber diameter of less than about 5.5 μm, said minor portion being composed of glass or mineral fibers and comprising about 1-30 percent of the dry weight of the web, and wherein said mat has a permeability of at least about 300 cfm/ft$^2$ measured in accordance with ASTM Standard D737 at a differential pressure of 0.5 inches of water wherein the resinous binder further comprises a cross-linker in an amount ranging up to about 10 weight percent.

2. A gypsum board as recited by claim 1, wherein said chopped glass fibers are composed of at least one member selected from the group consisting of E glass, C glass, T glass, sodium borosilicate glass, and mixtures thereof.

3. A gypsum board as recited by claim 1, wherein said chopped glass fibers are composed of E glass.

4. A gypsum board as recited by claim 1, wherein said chopped glass fibers have an average fiber length ranging from about 5 to 30 mm.

5. A gypsum board as recited by claim 1, wherein said chopped glass fibers have an average fiber length ranging from about 6 to 12 mm.

6. A gypsum board as recited by claim 1, wherein said fine staple fibers are composed of at least one member selected from the group consisting of fibers of glass, mineral wool, slag wool, ceramic, carbon, metal, refractory materials, and mixtures thereof.

7. A gypsum board as recited by claim 6, wherein said fine staple fibers are composed of C-glass.

8. A gypsum board as recited by claim 1, wherein said fine staple fibers have an average fiber diameter of less than about 3.5 μm.

9. A gypsum board as recited by claim 1, wherein said fine staple fibers have an average fiber diameter of less than about 1.9 μm.

10. A gypsum board as recited by claim 1, wherein said fine staple fibers have a fiber length of less than about 7 mm.

11. A gypsum board as recited by claim 1, wherein said minor portion comprises a portion of the weight of the dry web ranging from about 20 to 30 percent.

12. A gypsum board as recited by claim 1, said second facer comprising kraft paper.

13. A gypsum board as recited by claim 1, said second facer comprising a fibrous mat.

14. A gypsum board as recited by claim 1, wherein said resinous binder is composed of at least one member selected from the group consisting of urea formaldehyde; conventional modified urea formaldehyde; acrylic resin; melamine resin; high nitrogen melamine resin; homopolymer and copolymer of polyacrylic acid having a molecular weight of less than 10,000; crosslinking acrylic copolymer; crosslinked vinyl chloride acrylate copolymer; and modified acrylic latex binder.

15. A gypsum board as recited by claim 1, wherein said resinous binder is composed of a modified acrylic latex binder.

16. A gypsum board as recited by claim 14, wherein said cross linker is present in an amount ranging from about 2 to 5 weight percent.

17. A gypsum board as recited by claim 14, wherein said cross linker comprises melamine formaldehyde.

18. A gypsum board as recited by claim 1, wherein said resinous binder has a glass transition temperature ranging from about 15 to 45° C.

19. A gypsum board as recited by claim 1, wherein said gypsum core further comprises at least one water repellant agent.

20. A gypsum board as recited by claim 1, wherein said gypsum core further comprises a biocide.

21. A gypsum board as recited by claim 1, wherein said gypsum core further comprises reinforcing fiber.

22. A gypsum board as recited by claim 1, said board having flame resistance sufficient to pass the test of ASTM Method E84, Class 1.

23. In a gypsum board having a first face and a second face and a non-woven fibrous mat affixed to at least one of said faces, the improvement wherein said mat comprises a web bonded together with a resinous binder and comprising a blend of a major portion composed of chopped glass fibers having an average fiber diameter of about 11±1.5 μm and a minor portion composed of fine staple fibers having an average fiber diameter of less than about 5.5 μm, said minor portion being composed of glass or mineral fibers and comprising about 1-30 percent of the dry weight of the web, and said mat has a permeability of at least about 300 cfm/ft$^2$ measured in accordance with ASTM Standard D737 at a differential pressure of 0.5 inches of water wherein the resinous binder further comprises a cross-linker in an amount ranging up to about 10 weight percent.

24. A process for manufacturing an article comprising a hydraulic set material layer having first and second faces, and first and second facers affixed thereto, at least one of said facers comprising a non-woven, fibrous mat, the process comprising:
   a. forming an aqueous slurry comprising at least one member selected from the group consisting of anhydrous calcium sulfate, calcium sulfate hemi-hydrate, and hydraulic setting cement;
   b. distributing the slurry to form a layer on said first facing;
   c. applying said second facing onto the top of said layer;
   d. separating the resultant laminate into individual articles; and
   e. drying the articles,
   wherein at least one of the facers comprises a fibrous mat having a fibrous web comprised of a blend of a major portion of chopped continuous glass fibers, an average fiber diameter of about 11±1.5 micron and a minor portion of which is composed of fine staple fibers having an average fiber diameter of less than about 5.5 μm, said minor portion being composed of glass or mineral fibers and comprising about 1-30 percent of the dry weight of the web, and said major and minor portions being bound together with a resinous binder and said mat has a permeability of at least about 300 cfm/ft$^2$ measured in accordance with ASTM Standard D737 at a differential pressure of 0.5 inches of water, wherein the resinous binder further comprises a cross-linker in an amount ranging up to about 10 weight percent.

25. A fibrous mat for use as a facer for a gypsum board, the fibrous mat comprising a non-woven web bonded together with a resinous binder, said web comprising a blend of a major portion composed of chopped glass fibers having an average fiber diameter of about 11±1.5 and a minor portion composed of fine staple fibers having an average fiber diameter of less than about 5.5 μm, said minor portion comprising about 1-30 percent of the dry weight of the web, and the resinous binder comprising a modified acrylic latex binder, said mat having a permeability of at least about 300 cfm/ft$^2$ measured in accordance with ASTM Standard D737 at a differential pressure of 0.5 inches of water wherein the resinous binder further comprises a cross-linker in an amount ranging up to about 10 weight percent.

26. A fibrous mat comprising a non-woven web bonded together with a resinous binder, said web comprising a blend of a major portion composed of chopped glass fibers having an average fiber diameter of about 11±1.5 μm and a minor portion composed of fine staple fibers having an average fiber diameter of less than about 5.5 μm, said minor portion comprising about 1-30 percent of the dry weight of the web, the mat having a permeability of at least about 300 cfm/ft$^2$ measured in accordance with ASTM Standard D737 at a differential pressure of 0.5 inches of water wherein the resinous binder further comprises a cross-linker in an amount ranging up to about 10 weight percent.

27. A hydraulic set board, comprising:
   a. a hydraulic set material layer having a first and a second face; and
   b. first and second facers affixed to said first and second faces, at least one of said facers comprising a fibrous mat comprising a non-woven web bonded together with a resinous binder, said web comprising a blend of a major portion composed of chopped glass fibers having an average fiber diameter of about 11±1.5 μm and a minor portion composed of fine staple glass or mineral fibers having an average fiber diameter of less than about 5.5 μm, said minor portion comprising about 1-30 percent of the dry weight of the web, and wherein said mat has a permeability of at least about 300 cfm/ft$^2$ measured in accordance with ASTM Standard D737 at a differential pressure of 0.5 inches of water wherein the resinous binder further comprises a cross-linker in an amount ranging up to about 10 weight percent.

* * * * *